United States Patent [19]
Mochizuki et al.

[11] Patent Number: 5,638,120
[45] Date of Patent: Jun. 10, 1997

[54] ELECTRON SHUTTER CONTROL WITH EXPOSURE CONTROL RESPONSIVE TO SHUTTER GAIN DIFFERENCES

[75] Inventors: Teruhiko Mochizuki; Hiroshi Ueno, both of Tokyo; Masanori Yamaguchi, Kanagawa, all of Japan

[73] Assignee: Sony Corporation, Tokyo, Japan

[21] Appl. No.: 436,643

[22] Filed: May 8, 1995

Related U.S. Application Data

[63] Continuation of Ser. No. 103,794, Aug. 10, 1993.

[30] Foreign Application Priority Data

| Aug. 10, 1992 | [JP] | Japan | 4-235397 |
| Aug. 10, 1992 | [JP] | Japan | 4-235399 |
| Sep. 24, 1992 | [JP] | Japan | 4-279373 |
| Mar. 11, 1993 | [JP] | Japan | 5-077546 |

[51] Int. Cl.⁶ .................................... H04N 5/335
[52] U.S. Cl. .................... 348/296; 348/364; 396/233; 396/246
[58] Field of Search .................... 348/222, 229, 348/296, 362, 363, 364, 365; 354/410, 429; H04N 5/335

[56] References Cited

U.S. PATENT DOCUMENTS

| 4,701,626 | 10/1987 | Ishizaki et al. | 250/578 |
| 4,717,953 | 1/1988 | Chang et al. | 358/34 |
| 4,742,395 | 5/1988 | Nagai et al. | 348/296 |
| 4,805,024 | 2/1989 | Suzuki et al. | 348/296 |
| 4,984,002 | 1/1991 | Kokubo | 358/213.13 |
| 5,031,048 | 7/1991 | Naruto et al. | 348/296 |
| 5,040,070 | 8/1991 | Higashitsutsumi et al. | 358/213.13 |
| 5,040,072 | 8/1991 | Tsuji et al. | 358/228 |
| 5,157,502 | 10/1992 | Nakajima et al. | 358/213.19 |
| 5,315,394 | 5/1994 | Kurashige et al. | 348/229 |
| 5,422,669 | 6/1995 | Mori | 348/230 |
| 5,428,421 | 6/1995 | Kawahara et al. | 354/446 |
| 5,473,374 | 12/1995 | Shimizu et al. | 348/363 |

FOREIGN PATENT DOCUMENTS

| 0387817 | 9/1990 | European Pat. Off. | H04N 5/238 |
| 0476907 | 3/1992 | European Pat. Off. | H04N 3/15 |

OTHER PUBLICATIONS

Patent Abstracts of Japan, vol. 8, No. 089 (P-270) Apr. 24, 1984 and JP-A-59 005 212 (Fuji Shashin Koki KK) Jan. 12, 1984.

Patent Abstracts of Japan, vol. 9, No. 027 (E-294) Feb. 6, 1985 and JP-A-59 172 885 (Canon KK) Sep. 29, 1984.

Patent Abstracts of Japan, vol. 25, No. 553 (E-1010) Dec. 7, 1990 and JP-A-02 237 273 (Sony Corp.) Sep. 19, 1990.

Patent Abstracts of Japan, vol. 15, No. 315 (E-1099) Aug. 12, 1991 and JP-A-03 114 391 (Toshiba Corp. et al.) May 15, 1991.

*Primary Examiner*—John K. Peng
*Assistant Examiner*—Ngoc-Yen Vu
*Attorney, Agent, or Firm*—Hill, Steadman & Simpson

[57] ABSTRACT

The present invention is directed to a video camera which comprises an image sensing device for sensing an incident light to generate charges and supplying an output signal corresponding to the charges, the output signal comprising a recurrent vertical scanning period and a recurrent vertical blanking period, the vertical scanning period including a plurality of horizontal scanning periods, a comparator for comparing a level of the output signal with a reference level to generate a compared output signal, a circuit for generating a first clock pulse having the same frequency as a horizontal scanning period, a circuit for generating a second clock pulse having a frequency higher than that of the first clock pulse, and an exposure time controlling circuit for receiving the compared output signal and controlling an exposure time of the image sensing device in synchronism with the first clock pulse according to the compared output signal when the exposure time is within the vertical scanning period, and the exposure time controlling circuit controls the exposure time in synchronism with the second clock pulse when a whole exposure time is within a vertical blanking period.

11 Claims, 12 Drawing Sheets

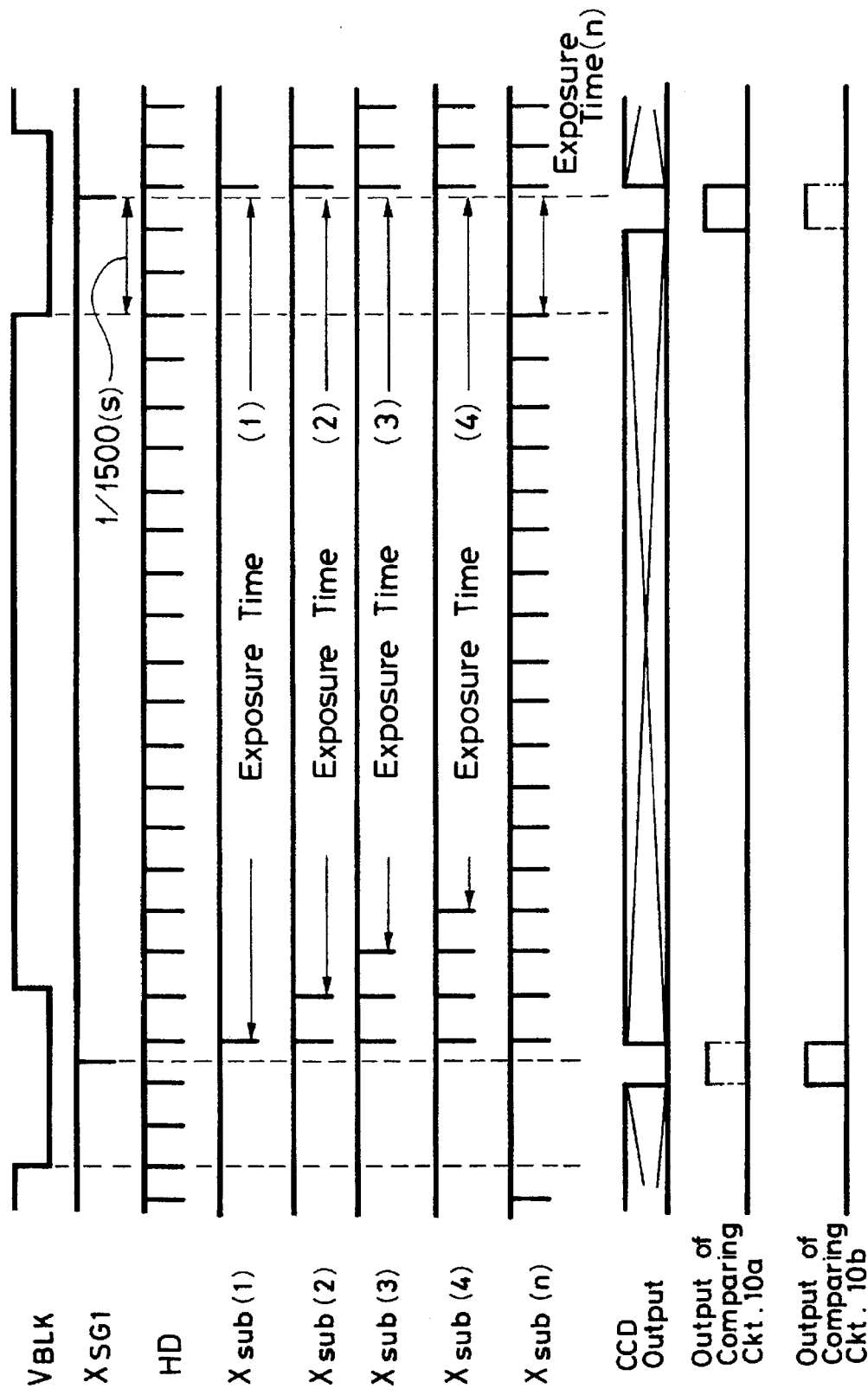

ELECTRON SHUTTER CONTROL WITH EXPOSURE CONTROL RESPONSIVE TO SHUTTER GAIN DIFFERENCES

This is a continuation of application Ser. No. 08/103,794, filed Aug. 10, 1993.

BACKGROUND OF THE INVENTION

1. Field of the Invention

The present invention generally relates to an electronic iris control circuit for a CCD (charge-coupled device) video camera. More specifically, this invention relates to an electronic iris control circuit in which an average value of a video signal based on signal charges, accumulated in a plurality of pixels of a solid state imaging device and sequentially transferred, is detected, a detected value of the average value of the video signal and a comparison reference value are compared with each other by one or a plurality of comparing circuits to detect one of a plurality of separated regions, which result from separating a maximum value and a minimum value, to which the detected value belongs and a timing at which a shutter pulse for discharging the signal charges from the respective pixels of the solid state imaging device is supplied is controlled on the basis of a detected result to thereby control a signal charge accumulation time period of each pixel.

2. Description of the Prior Art

Conventional solid state image sensors, e.g., CCD solid state image sensors are designed so as to discharge a signal charge accumulated in each of photo-electric converting elements within the solid state imaging device to an overflow drain region or to a semiconductor substrate side by the application of a shutter pulse. An exposure time of such solid state image sensor also can be changed by adjusting a charge accumulation time within a field period by the application of the shutter pulse.

The charge accumulation time is controlled by the shutter pulse at the unit of 1H (H is the horizontal period) because a timing at which the shutter pulse is applied is limited to a horizontal blanking period. The application timing of the shutter pulse is limited to the horizontal blanking period in order to avoid a noise from entering a video signal.

One video camera using such solid state imaging device effectively utilizes such electronic shutter function thereof to control its iris.

FIG. 1 of the accompanying drawings shows a conventional electronic iris control circuit. FIG. 2 is a timing chart used to explain operation of the electronic iris control circuit shown in FIG. 1.

In FIG. 1, reference numeral 1 designates a lens, 2 a solid state imaging device, 3 a sample and hold (S/H) circuit which samples and holds an output from the solid state imaging device 2, 4 an AGC (automatic gain control) circuit, 5 a gamma-correcting circuit, 6 a white level clipping circuit and 7 a clamping circuit.

There is shown an example of a conventional electronic iris control circuit that is generally depicted by reference numeral 8a in FIG. 1. As shown in FIG. 1, the electronic iris control circuit 8a comprises a low-pass filter (LPF) 9 which integrates the output of the sample and hold circuit 3, comparing circuits 10a, 10b and a shutter control circuit 11.

The low-pass filter 9 is adapted to detect a brightness (average brightness) of the whole screen by integrating the output of the sample and hold circuit 3. The comparing circuits 10a and 10b are adapted to determine by comparing a detected value of such brightness with different reference values V1, V2 whether the detected value is larger than the reference value V1, the detected value falls between the reference values V1 and V2 or whether the detected value is smaller than the reference value V2. The shutter control circuit 10 is adapted to increase a shutter speed when the output of the low-pass filter 9 is higher than the reference value V1 and to decrease the shutter speed when the output of the low-pass filter 9 is lower than the reference value V2. When the output of the low-pass filter 9 is lower than the reference value V1 and higher than the reference value V2, the shutter speed is not changed.

In FIG. 2, reference symbol $V_{BLK}$ depicts a vertical blanking signal, $X_{SG1}$ a read-out signal (ROG), HD a horizontal synchronizing signal and $X_{sub(1)}$ to $X_{sub(n)}$ depict shutter pulses representative of discharge commands in the respective examples which will be described later.

The exposure time of the solid state imaging device is longest in the case of the shutter pulse $X_{sub(x)}$, and can be changed at the unit of horizontal period such as $X_{sub(2)}$, $X_{sub(3)}$, $X_{sub(4)}$, ... The exposure time covers a time period starting from a time point at which the final pulse of shutter pulses generated at every horizontal period after the read-out signal $X_{SG1}$ was produced to a time point at which the next read-out signal $X_{SG1}$ is generated. Then, the shutter pulse is inhibited from being generated during the vertical blanking period in the prior art. Therefore, the exposure time is 1/1500 second when the iris is made largest and an iris dynamic range in the prior art falls in a range of from 1/60 second to 1/1500 second.

Meanwhile, the iris dynamic range falls in a range of from 1/60 second to 1/1500 second in the prior art as described above. However, a request for widening the iris dynamic range cannot be satisfied in the prior art. If the iris dynamic range is widened, when intensity of light irradiated on the solid state imaging device is high, then a so-called hunting occurs in the iris control operation. This hunting will be described more fully below.

While the electronic iris control circuit controls the shutter such that an average value of the output signal from the solid state imaging device becomes constant, if a width in which the output signal is changed by the control of exposure time is larger than a width of dead zone of the iris control system, then it is unavoidable that the hunting occurs. Then, the shorter the exposure time becomes, the larger the level of the output signal of the solid state imaging device is changed per the change of exposure time of one step is changed. Accordingly, if intensity of light irradiated on the solid state imaging device is larger, then the hunting occurs.

The shutter pulse $X_{sub(1)}$ shown in FIG. 2 will be described by way of example. In this case, a rate with which the exposure time is changed when the exposure time is reduced by one unit time, i.e., a shutter gain difference {[exposure time (1)—exposure time (2)]/exposure time (1)} is very small.

However, when the exposure time becomes very short, i.e., nearly 1/1500 second, a denominator of the shutter gain difference=[exposure time (n)—exposure time (n+1)]/exposure time (n), which is the equation for obtaining the shutter gain difference, becomes very small while its numerator is constant (i.e., 1H). A ratio between the maximum value and the minimum value of the shutter gain differences becomes about 10:1.

Because, the frequency of 1H is 15734 Hz and hence the time unit in which the exposure time can be changed is 1/15734 second while a time at which the read-out signal $S_{SG1}$ occurs after the vertical blanking period was started (i.e., this time is nearly equal to the maximum exposure time in the prior art) is 1/1500 second. If the output signal from the solid state imaging device is changed considerably by shifting the exposure time by one unit time as described above, then the hunting occurs unavoidably. As a result, the shutter gain difference become maximum immediately after the vertical blanking period was ended. To prevent the hunting from occurring even when the shutter gain difference is maximum (substantially 10%), a dead zone width is set in the prior art. However, if it is intended that the shutter pulse occurs even in the vertical blanking period in order to widen the dynamic range, then the shutter gain difference becomes considerably large because the frequency of the shutter pulse is set to 15734 Hz constantly. Therefore, the hunting occurs.

For this reason, the conventional maximum shutter speed is limited to 1/1500 second and the iris dynamic range is limited in a range of from 1/60 second to 1/1500 second.

Further, in order to avoid the hunting, a dead zone is set in the prior art as shown in FIG. 3. To be more concrete, as a reference value used when the output from the low-pass filter 9 is compared with the reference value, there are set two reference values, i.e., an upper reference value V1 and a lower reference value V2. If the output from the low-pass filter 9 is higher than the upper reference value V1, then the shutter speed is increased. If the output from the low-pass filter 9 is lower than the lower reference value V2, then the shutter speed is decreased. If the output from the low-pass filter 9 lies between the reference values V1 and V2, the shutter speed is not changed. Thus, the dead zone is set.

The width of the dead zone, i.e., V1–V2 is made constant regardless of the duration of the charge accumulation time. More specifically, the width of the dead zone is set to a value commensurate with the maximum value of the shutter gain difference in the vertical scanning period, i.e., the shutter gain difference (10%) provided just before the vertical blanking period is started.

In the conventional electronic iris control circuit, the width of the dead zone is set regardless of the duration of the charge accumulation time. There is then the problem that a sensitivity in the iris control operation is lowered unnecessarily when the charge accumulation time is reduced more.

That is to say, the dead zone width must be increased in accordance with the increase of the shutter gain difference or else the hunting occurs. Consequently, it is unavoidable that the dead zone width is increased in the portion where the shutter gain difference is large, i.e., the charge accumulation time is short.

The dead zone width might be narrow if the shatter gain difference is small. In the prior art, however, the dead zone width is made wide in accordance with the maximum value of the shutter gain difference, and the dead zone width is unnecessarily wide in the portion in which the shutter gain difference is small.

If the dead zone width is unnecessarily wide, a sensitivity is lowered uselessly, which unavoidably causes a large error to be produced in the level of the output signal from the solid state imaging device. The reason for this is as follows. Even though the dead zone has the width, it is customary that a target value of the output signal level of the solid state imaging device, i.e., an ideal converging value is a central value between the upper reference value V1 and the lower reference value V2. Besides, the iris cannot be controlled in the range of the dead zone. There is then the possibility that the output signal from the solid state imaging device is set to a level relatively largely distant from the target value. In other words, the dead zone width serves also as the error range so that, if the dead zone width is widened unnecessarily, then it is unavoidable that the error range is widened unnecessarily. Therefore, the level of the video signal must be kept constant by the succeeding AGC circuit 4 and the AGC circuit 4 of high efficiency is indispensable for the conventional iris control circuit.

Furthermore, according to the conventional electronic iris control circuit, the iris is controlled by decreasing or increasing the exposure time by one horizontal period each during the vertical scanning period. There is then the problem that an optimum exposure is realized with plenty of time, i.e., that a response speed is low.

More specifically, the range that the iris can be controlled in the vertical scanning period falls in a range of from 1/60 second to 1/1500 second and about 254 steps are contained in the above iris controllable range. If it is intended that the exposure time is changed from one to the other end of such iris controllable range, then only 60 steps are changed per second. Therefore, it takes about 4.2 seconds to reach the optimum iris. That is to say, the iris is not changed substantially by one step in the darkness and the response speed becomes very low.

In the conventional electronic iris control circuit shown in FIG. 1, as shown in FIG. 2, the comparing circuits 10a, 10b are constantly operated. If the output from the low-pass filter 9 is changed regardless of the vertical blanking period and the vertical effective period, then the outputs from the comparing circuits 10a, 10b can be changed. The change of this output represents a large and severe change of an amplitude between Vcc (e.g., 5 V) and 0 V. This change causes a crosstalk that exerts a seriously bad influence upon a video signal of very small level, whereby a noise is produced on the picture screen and a picture quality is deteriorated.

OBJECTS AND SUMMARY OF THE INVENTION

Therefore, it is a general object of the present invention to provide an improved electronic iris control circuit in which the aforesaid shortcomings and disadvantages encountered with the prior art can be eliminated.

More specifically, an object of the present invention is to provide an electronic iris control circuit in which a dynamic range of an iris can be widened while there occurs no hunting when the iris is controlled.

Another object of the present invention is to provide an electronic iris control circuit in which an error range used when an electronic iris is controlled can be narrowed in response to a charge accumulation time while there occurs no hunting.

Still another object of the present invention is to provide an electronic iris control circuit in which a response speed can be increased.

A further object of the present invention is to provide an iris control circuit in which a picture quality can be prevented from being deteriorated when a bad influence is exerted upon a video signal by the change of an output from a comparing circuit during a vertical effective period.

According to a first aspect of the present invention, there is provided a video camera which comprises an image sensing device for sensing an incident light to generate charges and supplying an output signal corresponding to the charges, the output signal comprising a recurrent vertical scanning period and a recurrent vertical blanking period, the vertical scanning period including a plurality of horizontal scanning periods, a comparator for comparing a level of the output signal with a reference level to generate a compared output signal, a circuit for generating a first clock pulse having the same frequency as a horizontal scanning period, a circuit for generating a second clock pulse having a frequency higher than that of the first clock pulse, and an exposure time controlling circuit for receiving the compared output signal and controlling an exposure time of the image sensing device in synchronism with the first clock pulse according to the compared output signal when the exposure time is within the vertical scanning period, and the exposure time controlling circuit controlling the exposure time in synchronism with the second clock pulse when a whole exposure time is within a vertical blanking period.

According to a second aspect of the present invention, there is provided a video camera which comprises an image sensing device for sensing an incident light and generating charges and supplying an output signal corresponding to the charges, first and second comparators for comparing a level of the output signal with first and second variable reference levels to generate a compared output signal, an exposure time controlling circuit for receiving the compared output signal and controlling an exposure time of the image sensing device according to the compared output signal, and a control circuit for controlling the first and second reference levels according to a duration of the exposure time such that a difference between the first and second reference levels increases as the exposure time become shorter.

According to a third aspect of the present invention, there is provided a video camera which comprises an image sensing device for sensing an incident light and generating charges and supplying an output signal corresponding to the charges, first, second, third and fourth comparators for comparing a level of the output signal with first, second, third and fourth reference levels from high to low level, respectively, to generate a compared output signal, and an exposure time controlling circuit for receiving the compared output signal and controlling an exposure time of the image sensing device according to the compared output signal.

According to a fourth aspect of the present invention, there is provided a video camera which comprises an image sensing device for sensing an incident light, generating charges and supplying an output signal corresponding to the charges, the output signal having recurrent blanking intervals interspersed with active picture intervals, a comparator for comparing a level of the output signal with a reference level to generate a compared output signal, the comparator being disabled during the active picture intervals, and an exposure time controlling circuit for receiving the compared output signal and controlling an exposure time of the image sensing device according to the compared output signal.

The above and other objects, features, and advantages of the present invention will become apparent from the following detailed description of illustrative embodiments thereof to be read in conjunction with the accompanying drawings, in which like reference numerals are used to identify the same or similar parts in the several views.

BRIEF DESCRIPTION OF THE DRAWINGS

FIG. 12 is a timing chart used to explain operation of the electronic iris control circuit of the fourth embodiment shown in FIG. 10.

DETAILED DESCRIPTION OF THE PREFERRED EMBODIMENTS

The present invention will now be described with reference to the drawings.

Figure 4:
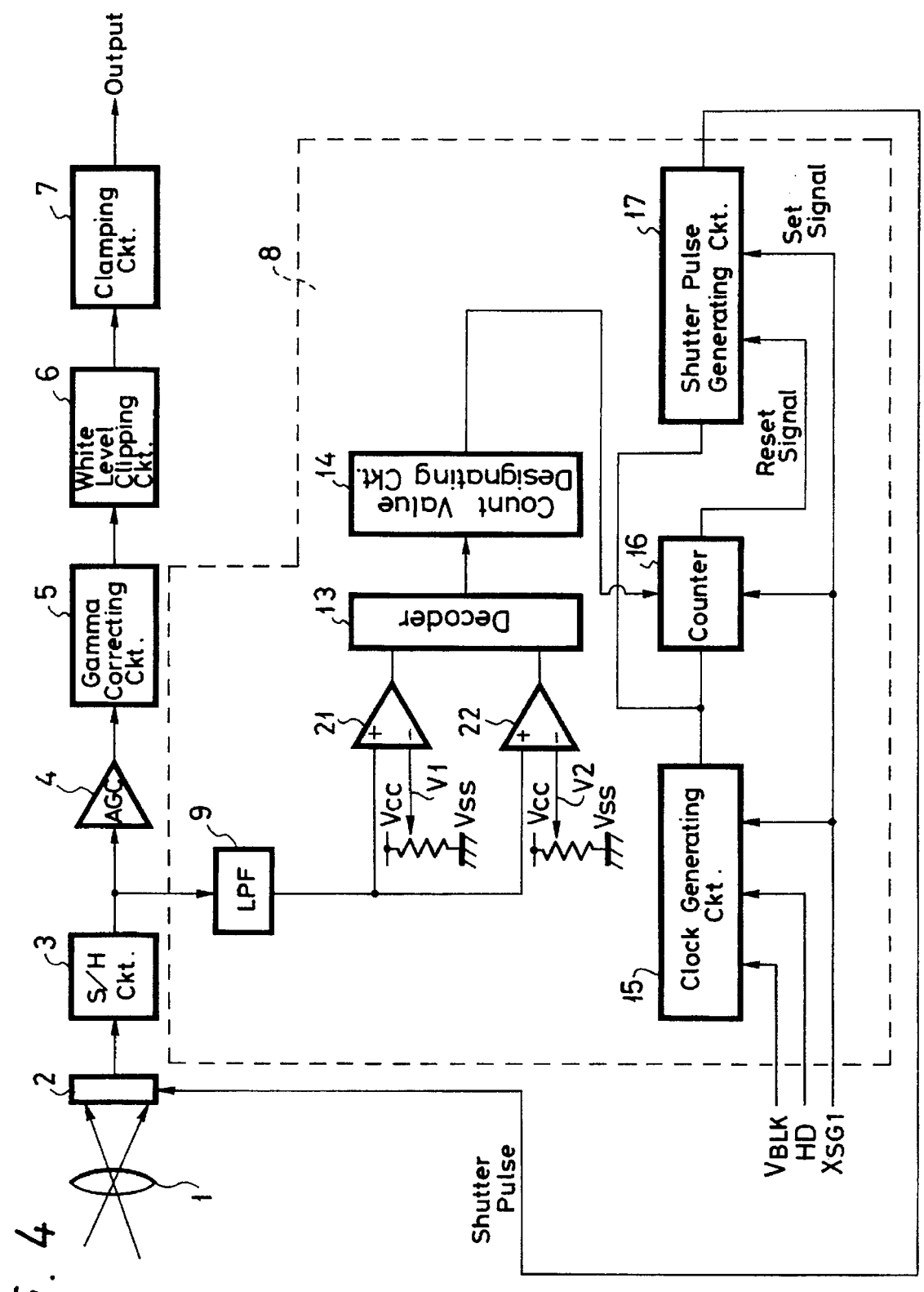
FIG. 4 is a block diagram showing an electronic iris control circuit according to a first embodiment of the present invention.
Figure 5:
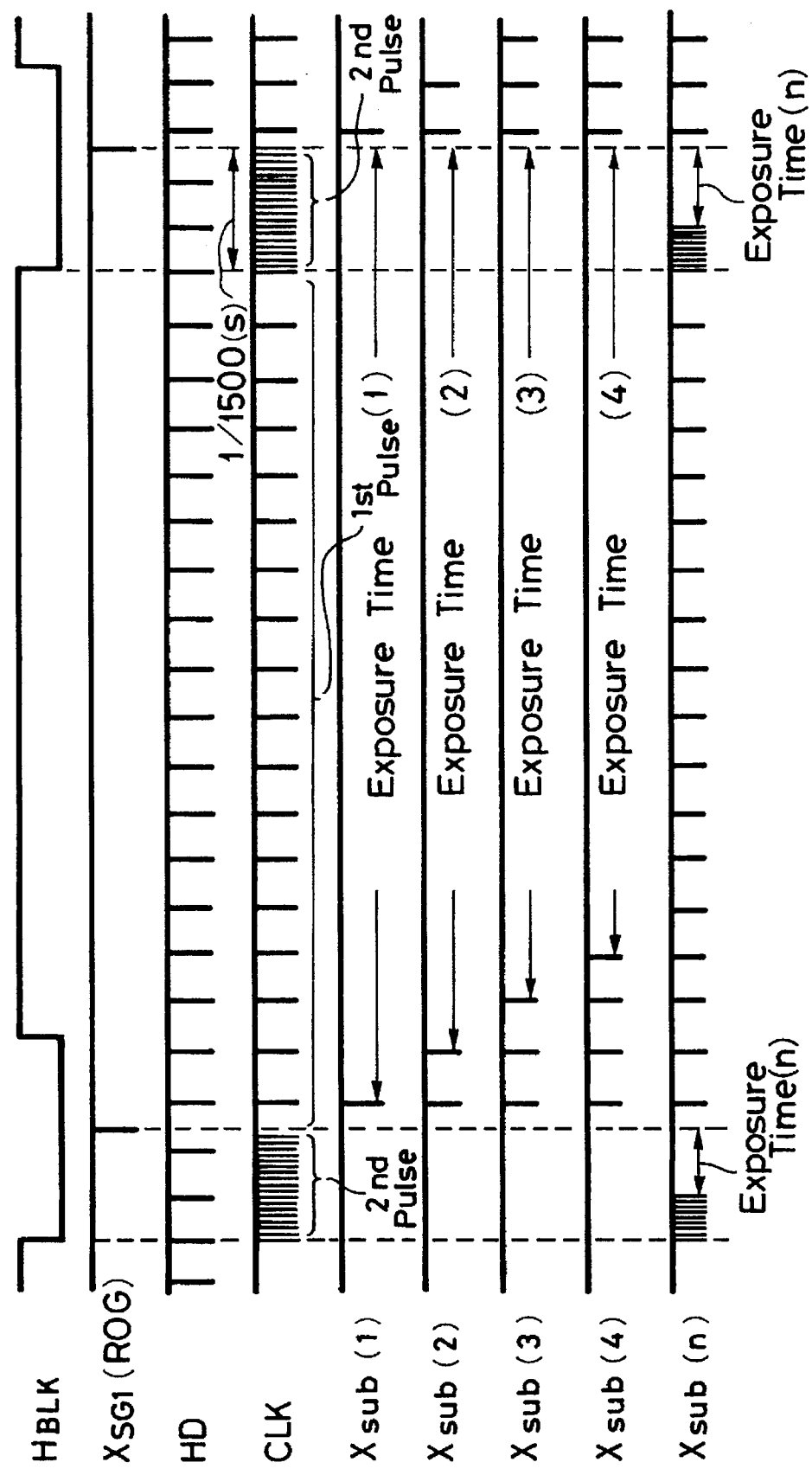
FIG. 5 is a timing chart used to explain operation of the electronic iris control circuit of the first embodiment shown in FIG. 4.

FIGS. 4 and 5 show an electronic iris control circuit according to a first embodiment of the present invention. FIG. 4 is a block diagram showing a circuit arrangement of an iris control circuit for a video camera according to the first embodiment of the present invention. FIG. 5 is a timing chart used to explain operation of the electronic iris control circuit shown in FIG. 4.

Figure 1:
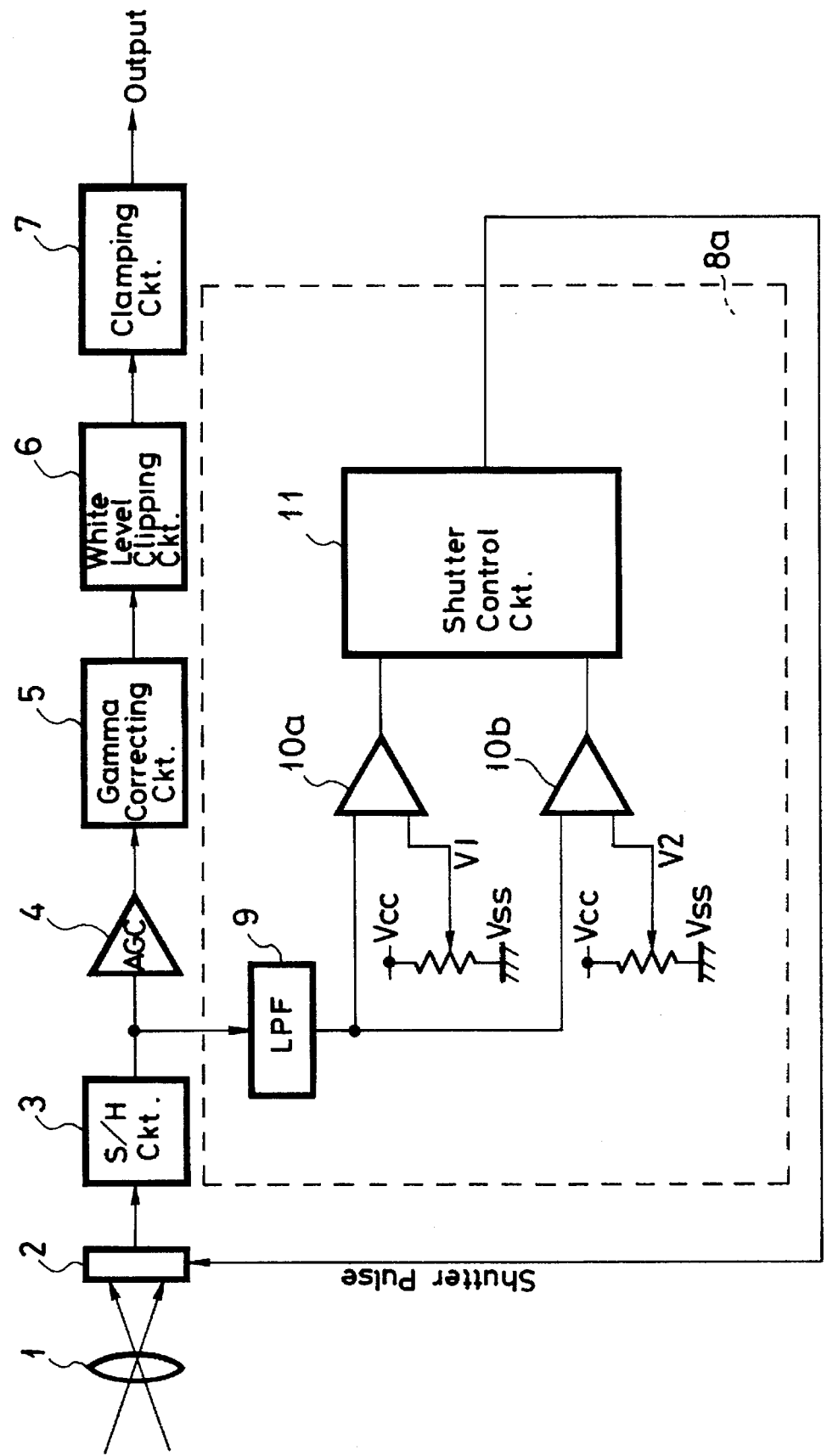
FIG. 1 is a block diagram showing an example of a conventional electronic iris control circuit.
Figure 2:
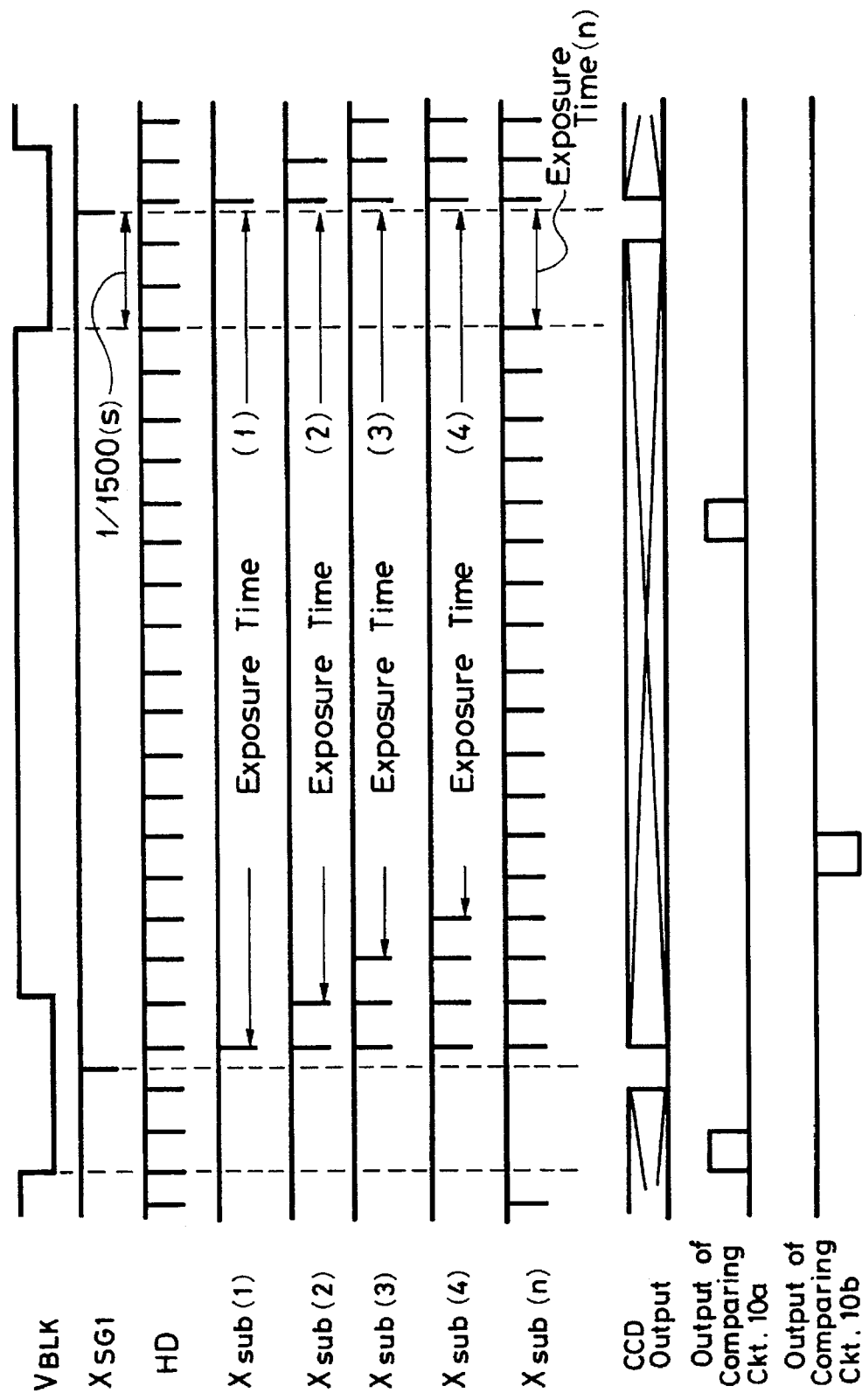
FIG. 2 is a timing chart used to explain operation of the conventional iris control circuit shown in FIG. 1.

While the electronic iris control circuit according to this embodiment has specific features different from those of the conventional electronic iris control circuit shown in FIGS. 1 and 2, common elements and parts were already described in the preamble and need not be described herein. Only different elements and parts will be hereinafter described, in which like reference numerals are used to identify the same or similar parts through several views.

As shown in FIG. 4, there is provided the electronic iris control circuit 8 which comprises the following elements.

The low-pass filter 9 integrates a video signal output from the sample and hold circuit 3 to convert the same into a DC value. Comparing circuits 21, 22 are adapted to compare an output voltage of the low-pass filter 9 with the reference voltages V1, V2 (V1>V2). The comparing circuit 21 compares the output voltage of the low-pass filter 9 with the reference voltage V1 and the comparing circuit 22 compares the output voltage of the low-pass filter 9 with the reference voltage V2.

A decoder 13 outputs an addition command signal or a subtraction command signal on the basis of the compared results from the comparing circuits 21, 22. To be more concrete, when the comparing circuit 11 outputs a signal representative of the compared result that the output signal from the low-pass filter 9 is higher than the reference voltage V1, the decoder 13 outputs the addition command signal, which leads to the increase of the shutter speed.

When the comparing circuit 22 outputs a signal representative of the compared result that the output signal from the low-pass filter 9 is lower than the reference voltage V2, the decoder 13 outputs the subtraction command signal, which leads to the decrease of the shutter speed.

Figure 3:
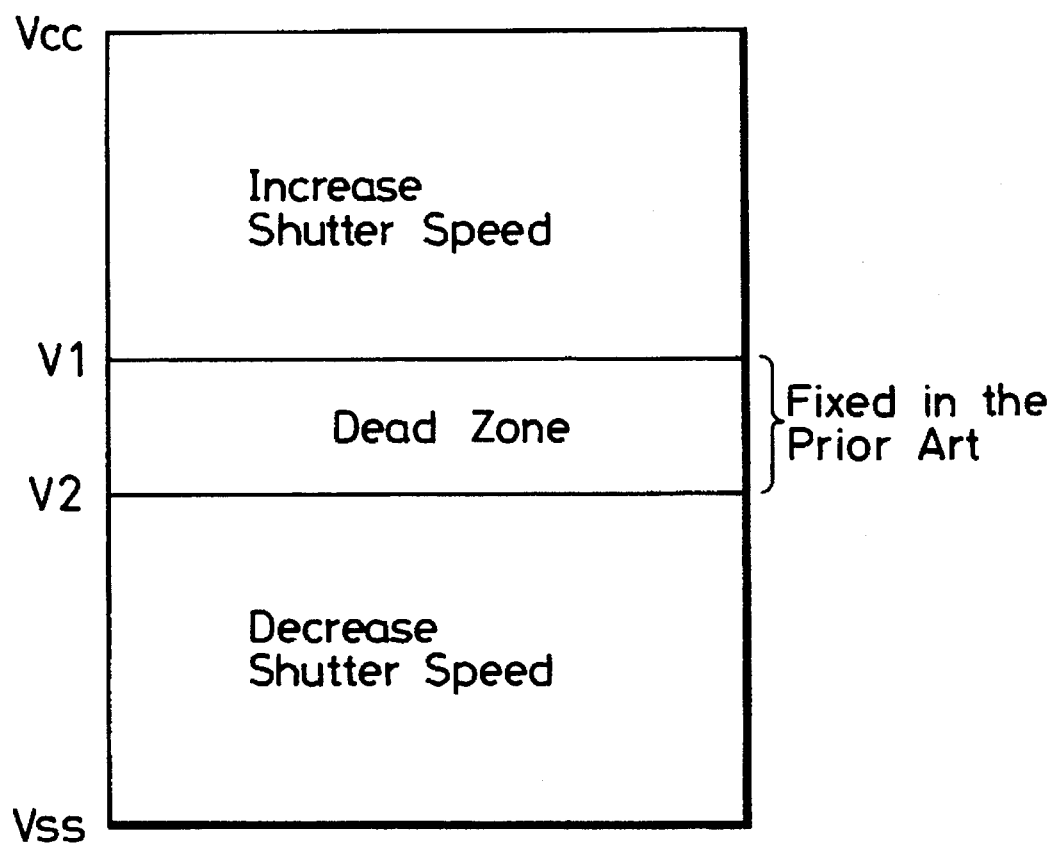
FIG. 3 is a schematic diagram used to explain a dead zone.

When neither the comparing circuit 21 nor the comparing circuit 22 outputs the signal, or when the output signal from the low-pass filter 9 is lower than the reference voltage V1 and higher than the reference voltage V2, the decoder 13 outputs neither the addition command signal nor the subtraction command signal. A portion between the first and second reference voltages V1 and V2 is the dead zone, as shown in FIG. 3, that is made a little wider than the amount that the signal level of the output signal from the solid state imaging device 2 is changed when one unit time ($\frac{1}{15734}$ second) exposure time is changed at the portion in which the shutter gain difference is 10%.

There is shown a count value designating circuit 14 which stores therein a pulse count value that determines a shutter speed and which increases or decreases a count value on the basis of the command signal from the decoder 13.

There is provided a clock generating circuit 15 which receives the vertical blanking signal $V_{BLK}$, the read-out signal $X_{SG1}$ and the horizontal synchronizing signal HD to generate a clock pulse CLK. This clock pulse CLK becomes a shutter pulse when it is gated by a shutter clock pulse generating circuit 17 which will be described later on.

The clock generating circuit 15 generates a first pulse at every horizontal blanking period in response to the readout signal $X_{SG1}$. The frequency of this first pulse is of course 15734 Hz. The clock generating circuit 15 keeps generating the first pulse of 15734 Hz in response to the read-out signal $X_{SG1}$ during a time period in which the vertical blanking period is ended, the next vertical scanning period started and this vertical scanning period is ended. When the next vertical blanking period is started after the vertical scanning period was ended, the pulse generated by the clock generating circuit 15 is switched from the first pulse to a second pulse. The second pulse has a frequency of 2 MHz (or 1 MHz). When the read-out signal $X_{SG1}$ is generated during the vertical blanking period, the clock generating circuit 15 is placed in the condition that it may generate the first pulse. The clock generating circuit 15 repeats such operation at every field period.

The reason that the frequencies of the pulses generated during the vertical scanning period and the vertical blanking period are varied will be described below.

In order to prevent a noise from entering the video signal from the solid state imaging device 2 due to the shutter pulse during the vertical scanning period, the shutter pulse is generated only in the horizontal blanking period. The vertical blanking period becomes the blanking period and there is then no risk that a noise enters the video signal due to the shutter pulse. Therefore, the timing at which the shutter pulse is generated is not restricted to the horizontal blanking period so that the exposure time can be changed in a short unit time. Further, the reason that the exposure time can be varied in a short unit time is that, if the period of the shutter pulse is constant, the shutter gain difference is increased as the exposure time becomes shorter, causing the hunting to take place. Therefore, the shutter gain difference can be prevented from being increased by reducing the unit time at which the exposure time is varied.

There is shown a counter 16 that counts the pulse output from the clock generating circuit 15. Specifically, the counter 16 starts the counting when it is reset by the read-out signal $X_{SG1}$. Also, the counter 16 generates a reset signal when the count value thereof reaches a count value stored in the count value designating circuit 14.

There is shown a shutter pulse generating circuit 17 which is set in response to the read-out signal $X_{SG1}$ and reset in response to the reset signal from the counter 16. During the shutter pulse generating circuit 17 is in the set state, the shutter pulse generating circuit 17 permits the pulse output from the clock generating circuit 15 to pass therethrough. During the shutter pulse generating circuit 17 is in the reset state, the shutter pulse generating circuit 17 inhibits the above pulse from passing therethrough. An output from the shutter pulse generating circuit 17 is applied to the solid state imaging device 2 as the shutter pulse.

Operation of the electronic iris control circuit shown in FIG. 4 will be described below.

The low-pass filter 9 derives a voltage corresponding to a brightness of a whole picture screen. This voltage from the low-pass filter 9 is compared with the reference voltages V1, V2 by the comparing circuits 21, 22 as shown in FIG. 3.

When the output voltage from the low-pass filter 9 is higher than the reference voltage V1, or when the brightness of the whole picture screen is too large, the decoder 13 outputs a command signal that increases the count value (value to be counted by the counter 16) of the count value designating circuit 14. When the output of the low-pass filter 9 is lower than the reference voltage V2, or when the brightness of the whole picture screen is too small, the decoder 13 outputs a command signal that decreases the count value of the count value designating circuit 14.

As earlier noted, in FIG. 3, the portion in which the output voltage of the solid state imaging device 2 falls between the reference voltages V1 and V2 is the dead zone and the hunting can be prevented from taking place by this dead zone. That is to say, if the width of the dead zone is wider than the voltage fluctuated amount of the DC level of the output signal from the solid state imaging device 2, this output signal corresponding to the unit time amount that the exposure time can be varied, it is possible to prevent the hunting from taking place. Therefore, the hunting preventing effect becomes remarkable as the width of the dead zone becomes wider. However, if the width of the dead zone is widened, then a control sensitivity is deteriorated. In other words, although the central value of the dead zone is preferably a value to be converged, if such value enters the dead zone, then the iris control becomes impossible. However, if the dead zone is wide, there is then the possibility that a video output is stabilized at the portion displaced from the converging value largely. Since the gain of the AGC circuit 4 is about—20 dB from a common sense standpoint, it is preferable that the dead zone width V1–V2 is about 10% of the dynamic range of the video signal. Therefore, the shutter gain difference is inhibited from exceeding 10% regardless of the vertical scanning period or the vertical blanking period.

Of course, when the output voltage from the low-pass filter 9 lies between the reference voltages V1 and V2, the decoder 13 is inhibited from adding or subtracting the count value of the count value designating circuit 14.

When the read-out signal $X_{SG1}$ is generated, the clock generating circuit 15 generates the clock pulse CLK of 15734 Hz in synchronism with the vertical synchronizing signal. Then, at the beginning of the vertical scanning period and at the end of the vertical scanning period, the frequency of the clock pulse CLK is changed to 2 MHz (or 1 MHz). The clock pulse CLK is counted by the counter 16. The counter 16 starts the counting when the counter 16 is supplied with the read-out signal $X_{SG1}$ and the count value thereof is designated by the count value designating circuit 14. The charge accumulation time (i.e., exposure time) becomes short as the count value becomes large. On the contrary, the charge accumulation time becomes long as the count value becomes small.

The shutter pulse generating circuit 17 gates the clock pulse CLK output from the clock generating circuit 15 and outputs the same to the solid state imaging device 2 as the shutter pulse. To be more concrete, the shutter pulse generating circuit 17 is set in response to the read-out signal $X_{SG1}$ supplied thereto to permit the output pulse CLK to pass therethrough. The shutter pulse generating circuit 17 is reset in response to the reset signal that is generated when the counter 16 counts the value designated by the count value designating circuit 14, thereby inhibiting the clock pulse CLK from passing therethrough. This inhibition is continued until the next read-out signal $X_{SG1}$ is supplied to the shutter pulse generating circuit 17. This inhibition period becomes a charge accumulation time (i.e., exposure time).

According to this electronic iris control circuit, when the brightness is too large, the count value of the counter 16 is increased so that the exposure time is reduced. Conversely, if the brightness is too small, the count value of the counter 16 is decreased so that the exposure time is extended. Therefore, the iris is controlled such that the output level of the solid state imaging device 2 becomes constant constantly, i.e,, the output level falls within the dead zone.

According to the electronic iris control circuit, the exposure time can be made shorter than a time period (1/1500 second) in which the read-out signal $X_{SG1}$ is supplied after the vertical blanking period was started because the shutter pulse can be generated even during the vertical blanking period.

While the shutter pulse can be generated at every 1H even during the vertical blanking period in the prior art, the exposure time can be reduced to 1/1500 second at most in order to avoid the hunting. For this reason, the dynamic range of iris falls within a range of from 1/60 second to 1/1500 second (28 dB). In accordance with the present invention, however, since the shutter pulse can be generated even within the vertical blanking period, the exposure time can be reduced considerably, i.e., the iris can be closed too much. In this embodiment, since the frequency of the shutter pulse is 2 MHz during the vertical blanking period, the dynamic range can be set in a range of from 1/60 second to 1/200000 second from a theory standpoint (exposure time can be reduced up to ten times the shutter pulse period so that the shutter gain difference falls within 10%). The iris dynamic range can be considerably extended depending upon the frequency of the second pulse.

That is to say, the iris dynamic range can be extended without the occurrence of the hunting. If the period of the shutter pulse is selected to be the horizontal period within the vertical blanking period similarly to the vertical scanning period, then the shutter gain difference in the vertical scanning period is increased considerably. The shutter gain difference becomes larger than at least the maximum value of the shutter gain difference within the vertical scanning period. The width of the dead zone must be increased more than that of the prior art or else the hunting occurs.

According to the present invention, since the frequency of the shutter pulse within the vertical blanking period is set to 2 MHz, the exposure time can be changed at the unit of 1/2000000 second. Therefore, the maximum value of the shutter gain difference within the vertical blanking period can be made smaller than the maximum value within the vertical scanning period.

According to the present invention, the iris can be controlled by changing the charge accumulation time at the unit of a period whose duration is shorter than that of one horizontal scanning period.

The iris can be controlled by changing the accumulation start time point at the unit of a period whose duration is shorter than the horizontal scanning period within the vertical blanking period.

Since the charge accumulation time is controlled by changing the accumulation starting time point at the unit of period shorter than one horizontal scanning period within the vertical blanking period, the shutter gain difference can be prevented from being increased without the occurrence of noise while the shortest charge accumulation time can be reduced as compared with the prior art. Therefore, the iris dynamic range can be widened without the hunting.

The shutter gain difference that is the ratio of the unit changing time of the charge accumulation time relative to the charge accumulation time provided when the charge starting time point lies within the vertical blanking period is selected so as not to exceed the maximum value of the shutter gain difference in the horizontal scanning period.

Therefore, since the charge accumulation time is controlled by changing the accumulation starting time point at the unit of period shorter than one horizontal scanning period within the vertical scanning period, the shutter gain difference can be prevented from being increased without the occurrence of noise.

The shutter gain difference that is obtained when the accumulation starting time point lies within the vertical blanking period is selected so as not to exceed the maximum value of the shutter gain difference obtained when the charge accumulation time is changed at the unit of horizontal period in the vertical scanning period.

Therefore, since the accumulation starting time point lies within the vertical blanking period, the iris dynamic range can be widened. Also, since the shutter gain difference within the vertical scanning period is made smaller than the maximum value in the vertical scanning period, the hunting can be avoided. In other words, the dynamic range of iris can be widened while the hunting can be prevented from taking place.

According to the present invention, there is provided the electronic iris control circuit for a video camera which comprises the integrating circuit for integrating the output signal from the solid state imaging device, the comparing circuit for comparing the output of the integrating circuit with the pre-determined reference value, the clock generating circuit for generating the first pulse in response to every horizontal blanking period within the vertical scanning period and generating the second pulse of period shorter than that of the first pulse during the period that is ahead of a timing point at which the read-out pulse is generated within the vertical scanning period, the counter for counting the first pulse during the vertical scanning period and counting the second pulse during the period that is ahead of the timing point at which the read-out pulse is generated within the vertical scanning period, the count value designating circuit means for designating the count value counted by the counter that increases or decreases the count value on the basis of the compared result, and the shutter pulse circuit for generating the shutter pulse on the basis of the output from the count value designating circuit to control the charge accumulation time of the solid state imaging device.

Therefore, since the shutter pulse is used by using the first pulse generated at every horizontal scanning period within the vertical scanning period and the second pulse of time period shorter than that of the first pulse within the vertical blanking period, and the charge accumulation time can be reduced or extended on the basis of the average brightness of the current video signal, the dynamic range of iris can be widened without the occurrence of the noise and the hunting.

Figure 7:
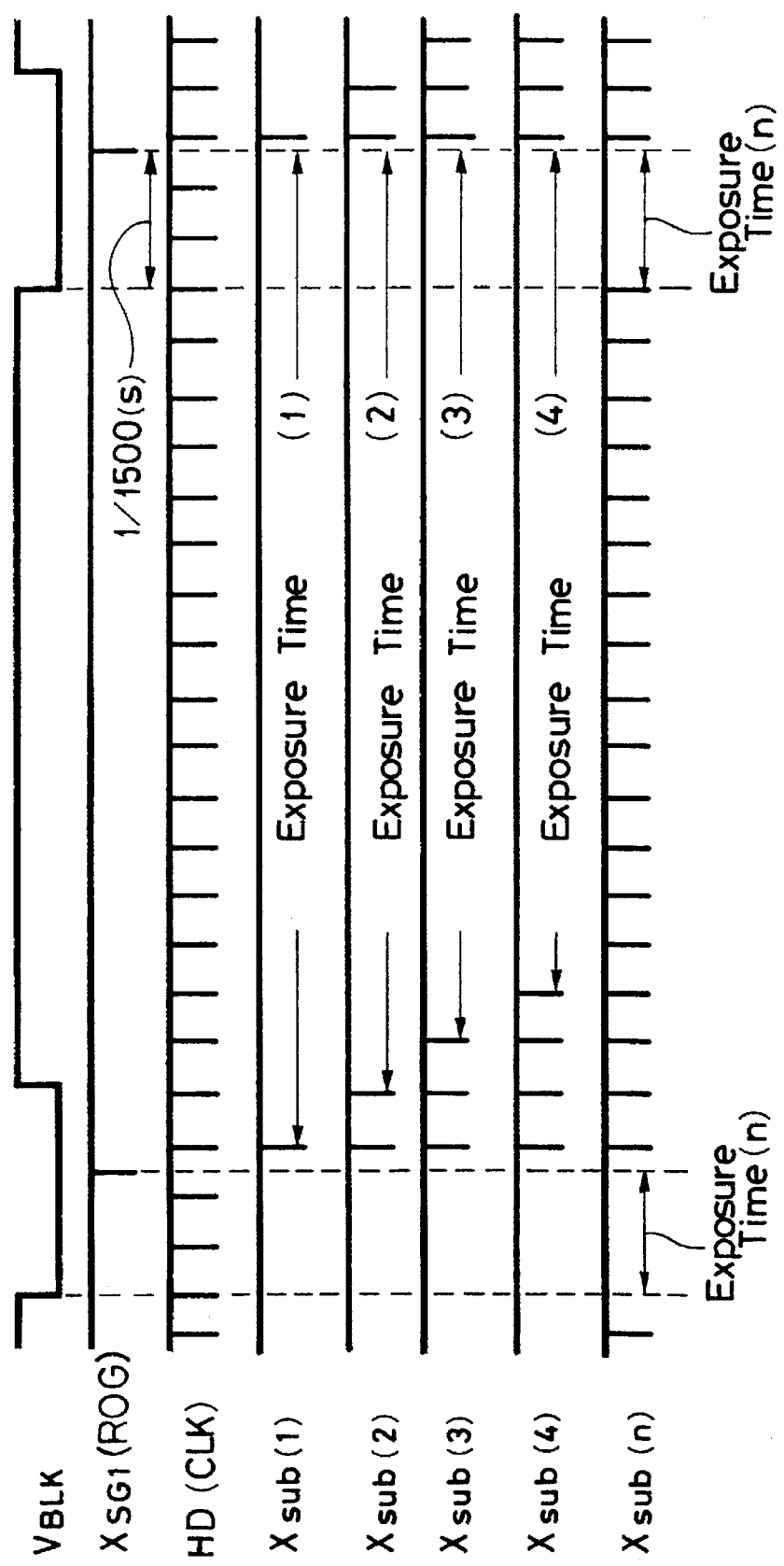
FIG. 7 is a timing chart used to explain operation of the electronic iris control circuit of the second embodiment shown in FIG. 6.

A second embodiment of the present invention will now be described with reference to FIGS. 7 to 9.

Figure 6:
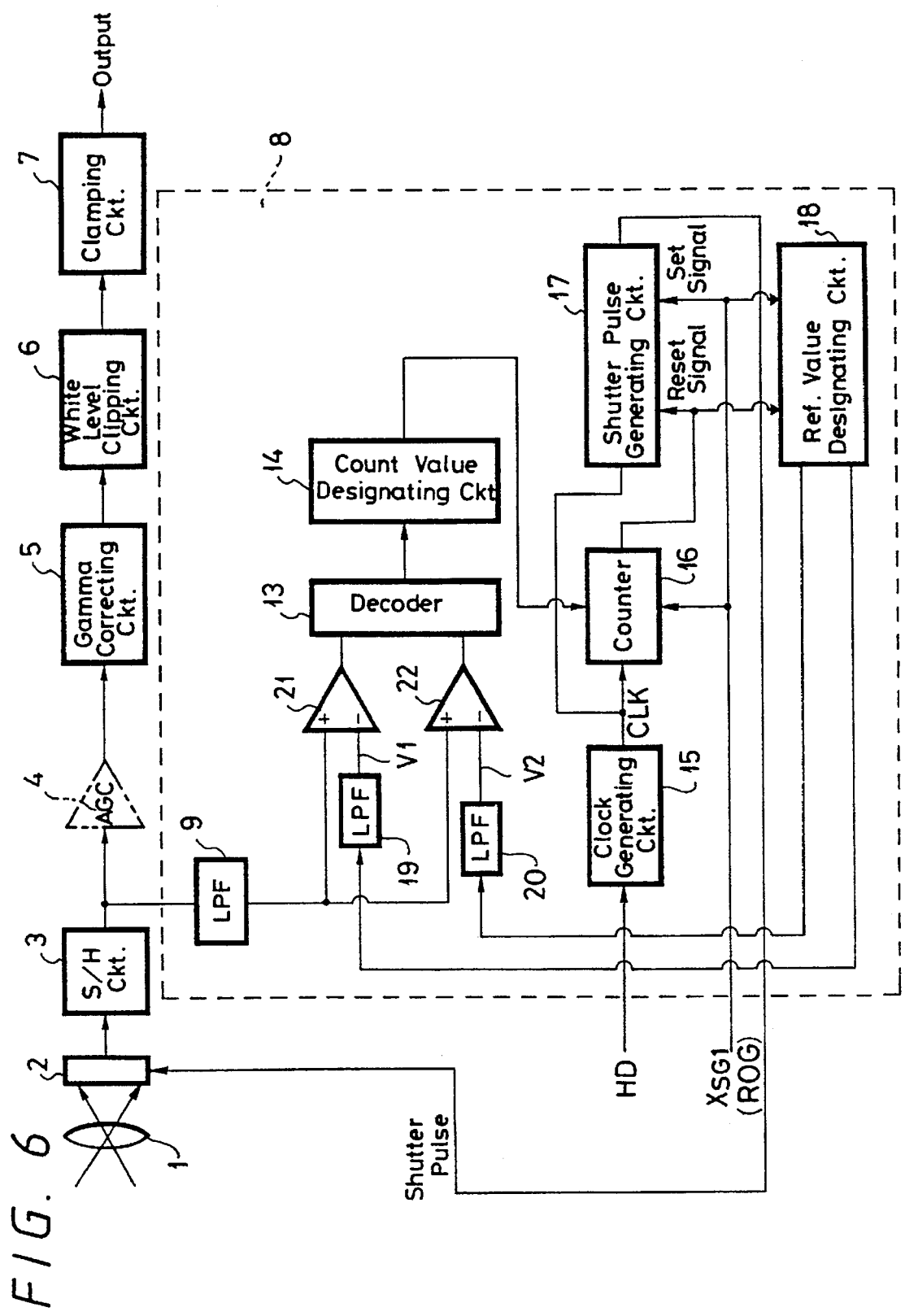
FIG. 6 is a block diagram showing an electronic iris control circuit according to a second embodiment of the present invention.

FIG. 6 is a block diagram showing a circuit arrangement of the electronic iris control circuit according to the second embodiment of the present invention. FIG. 7 is a timing chart used to explain operation of the electronic iris control circuit shown in FIG. 6 In FIGS. 6 and 7, like parts corresponding to those of FIGS. 4 and 5 are marked with the same references and therefore need not be described in detail.

Referring to FIG. 6, there is shown the electronic iris control circuit 8. The low-pass filter (LPF) 9 is adapted to integrate the video signal output from the sample and hold circuit 3 to convert the thus integrated video signal into the DC value. There are shown the comparing circuits 21, 22 that compare the output voltage of the low-pass filter 9 with the reference voltages V1, V2 (V1>V2). The comparing circuit 21 compares the output voltage of the low-pass filter 9 with the reference voltage V1, and the comparing circuit 22 compares the output voltage of the low-pass filter 9 with the second voltage V2.

The decoder 13 is adapted to output the addition command signal or the subtraction command signal on the basis of the compared results from the comparing circuits 21, 22. When the comparing circuit 21 outputs the signal representative of the compared result that the output signal of the low-pass filter 9 is higher than the reference voltage V1, the decoder 13 outputs the addition command signal so that the shutter speed is increased.

When the comparing circuit 22 outputs the signal representative of the compared result that the output signal from the low-pass filter 9 is lower than the reference voltage V2, the decoder 13 outputs the subtraction command signal so that the shutter speed is decreased. When neither the comparing circuit 21 nor the comparing circuit 22 outputs the signal, i.e., when the output signal of the low-pass filter 9 is lower than the reference voltage V1 and higher than the reference voltage V2, the decoder 13 outputs neither the addition command signal nor the subtraction signal.

The count value designating circuit 14 is adapted to store a pulse count value that determines the shutter speed and to increase or decrease the count value on the basis of the command signal from the decoder 13.

The clock generating circuit 15 is adapted to generate the clock pulse CLK that serves as the shutter pulse when it is gated by the shutter pulse generating circuit 17 which will be described later. The clock pulse CLK is generated from the clock pulse generating circuit 15 at every horizontal blanking period and therefore has the frequency of 15734 Hz. The reason for this is that the shutter pulse must be generated only during the horizontal blanking period in order to prevent the noise from entering the video signal output from the solid state imaging device 2 due to the shutter pulse during the vertical scanning period.

There is shown the counter 16 that counts the pulse output from the clock generating circuit 15. More specifically, the counter 16 starts to count the pulse when cleared or reset by the read-out signal $X_{SG1}$ (ROG). The counter 16 generates the reset signal when the count value reaches the count value designated by the count value designating circuit 14.

The shutter pulse generating circuit 17 is set in response to the read-out signal $X_{SG1}$ supplied thereto and reset by the reset signal supplied thereto from the counter 16. The shutter pulse generating circuit 17 permits the pulse output from the clock generating circuit 15 to pass therethrough while it is in the set state. The shutter pulse generating circuit 17 inhibits the pulse output from the clock generating circuit 15 from pass therethrough while it is in the reset state. The output from the shutter pulse generating circuit 17 is applied to the solid state imaging device 2 as the shutter pulse.

There is shown a reference value designating circuit that is formed of a pulse-width modulator. The reference value designating circuit 18 produces the upper reference voltage V1 and the lower reference voltage V2 of values corresponding to a time period during which the reference value designating circuit 18 is reset by the reset signal from the counter 16 after having received the read-out signal $X_{SG1}$. The voltages V1, V2 are then applied through DC low-pass filters 19, 20 to reference input terminals (−) of the comparing circuits 21, 22, respectively.

Figure 8:
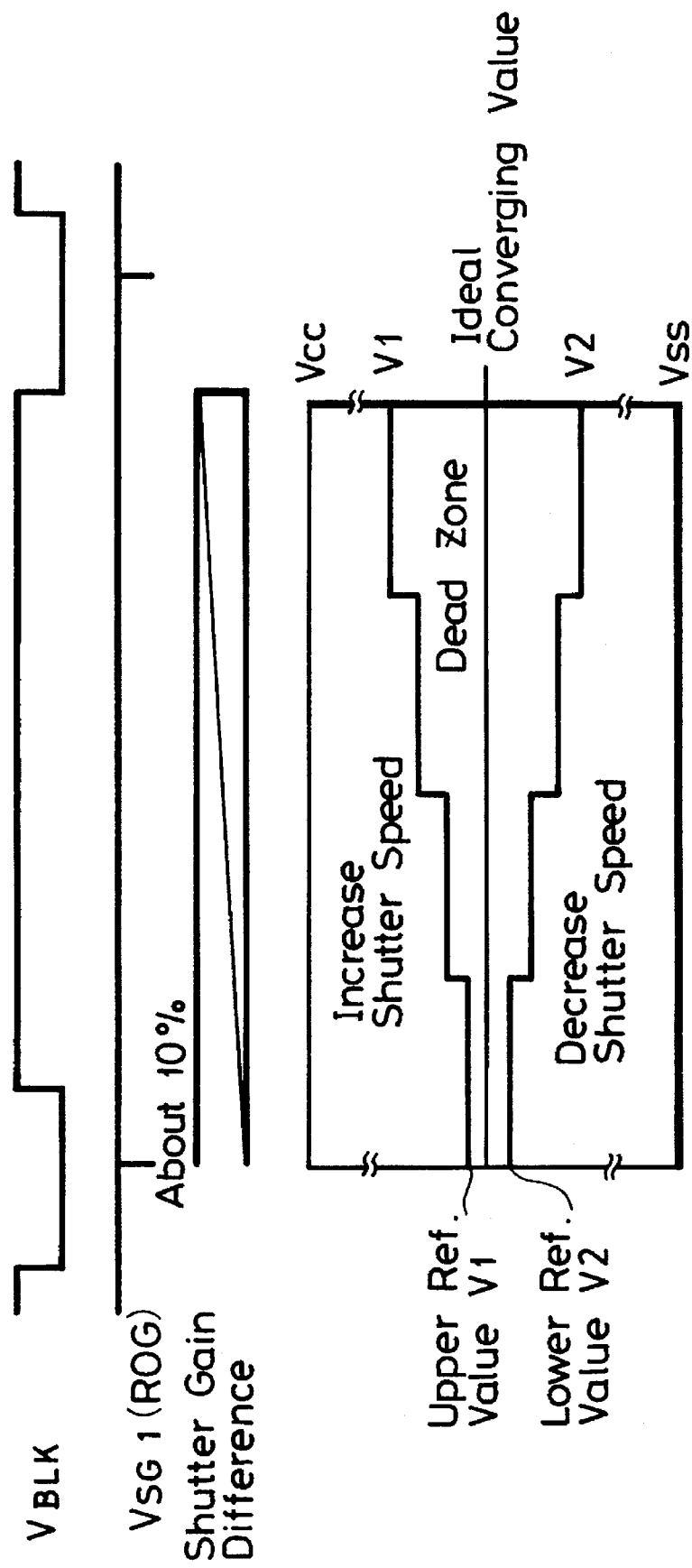
FIG. 8 is a schematic diagram showing a dead zone and to which references will be made in explaining operation of the electronic iris control circuit of the second embodiment shown in FIG. 6.

FIG. 8 is a schematic diagram used to explain that the dead zone width is changed in accordance with the exposure time. As the exposure time is reduced, in other words, as the shutter gain difference is increased, the upper and lower reference values V1, V2 are changed stepwise (in four steps) and the dead zone width is widened. To be more concrete, the upper reference value V1 is increased as the shutter gain difference is increased. The lower reference value V2 is decreased as the shutter gain difference is increased.

The reason for this is that the dead zone width is made narrow to an extent that any hunting will not occur in accordance with the magnitude of the shutter gain difference. The change of the dead zone width in accordance with the shutter gain difference may be of no step but may be made stepwise. In the latter case, four steps are enough in view of practical use.

Operation of the electronic iris control circuit shown in FIG. 6 will be described below.

The low-pass filter 9 outputs the voltage corresponding to the brightness of the whole picture screen. This output voltage is compared with the reference voltages V1, V2 by the comparing circuits 21, 22.

When the output voltage from the low-pass filter 9 is higher than the upper reference voltage V1, or when the brightness is too large, the decoder 13 outputs the command signal that increases the count value (value counted by the counter 16) of the count value designating circuit 14. When the output voltage from the low-pass filter 9 is lower than the reference voltage V2, or when the brightness is too small, the decoder 13 outputs the command signal that decreases the count value of the count value designating circuit 14.

The counter 16 starts to count the clock pulse CLK generated from the clock generating circuit 15 in response to the read-out signal $X_{SG1}$. When the counter 16 counts the count value designated by the count value designating circuit 14, the counter 16 supplies the reset signal to the shutter pulse generating circuit 17.

As described before, the shutter pulse generating circuit 17 gates the output pulse CLK from the clock generating circuit 15 and outputs the same to the solid state imaging device 2 as the shutter pulse. To be more concrete, the shutter pulse generating circuit 17 is set by the read-out signal $X_{SG1}$ supplied thereto to permit the output clock pulse CLK to pass therethrough. The shutter pulse generating circuit 17 is reset by the reset signal generated from the counter 16 when the counter 16 counts the count value designated by the count value designating circuit 14 to thereby inhibit the output clock pulse CLK from passing therethrough. This inhibition is continued until the next read-out signal $X_{SG1}$ is supplied to the shutter pulse generating circuit 17. Then, this inhibition period is served as the charge accumulation time (i.e., exposure time).

According to the electronic iris control circuit of the second embodiment of the present invention, when the brightness is too large, the count value of the counter 16 is increased so that the exposure time is reduced. Conversely, when the brightness is too small, the count value of the counter 16 is decreased so that the exposure time is extended. Consequently, the iris of the video camera is controlled so that the output level of the solid state imaging device 2 falls within the dead zone.

Figure 9:
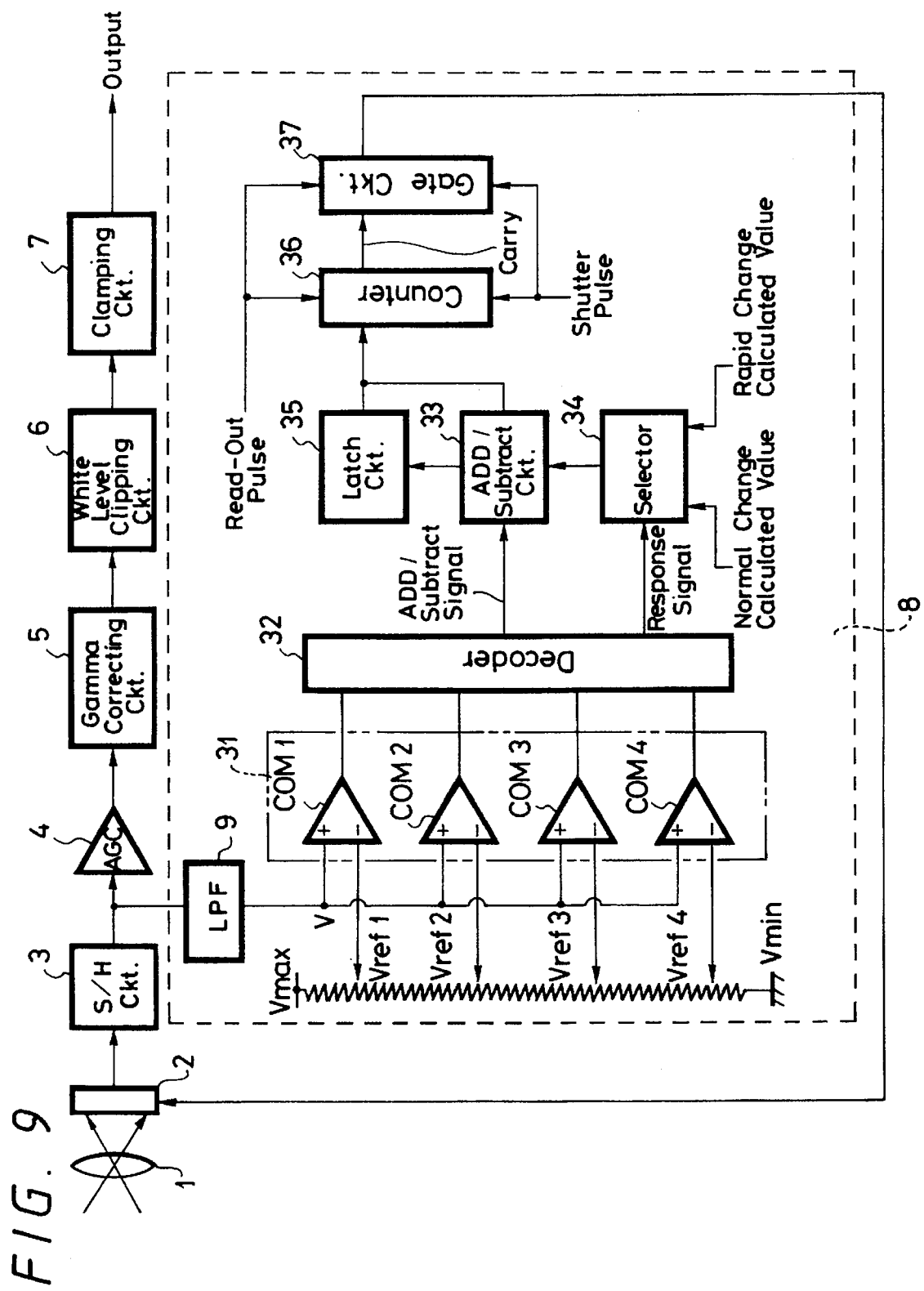
FIG. 9 is a block diagram showing an electronic iris control circuit according to a third embodiment of the present invention.

Since the reference value designating circuit 18 generates the upper and lower reference voltages V1, V2 corresponding to the exposure time, i.e., the shutter gain difference and applies the same through the low-pass filters 19, 20 to the reference voltage input terminals (−) of the comparing circuits 21, 22 to thereby change the width of the dead zone, as shown in FIG. 9, the width of the dead zone can be reduced in response to a small level of the shutter gain difference to an extent that no hunting occurs.

According to the second embodiment of the present invention, the iris of the video camera can be controlled with high accuracy by using the output from the solid state imaging device. As a result, the AGC circuit 4 shown in FIG. 4 is not always needed, i.e., the AGC circuit 4 in the second embodiment of the present invention may be removed as shown by a phantom block.

According to the second embodiment of the present invention, the difference between the upper and lower reference values is changed in response to the charge accumulation time as the charge accumulation time is reduced.

Therefore, since the width of the dead zone is changed in response to the charge accumulation time, the width of the dead zone can be reduced in response to the duration of the charge accumulation time without the risk of the occurrence of hunting. Besides, the error range of iris can be reduced in response to the charge accumulation time, i.e., the width of the dead zone can be widened in response to the control sensitivity in the current shutter speed. Thus, the control sensitivity can be increased to the maximum accuracy determined from a principle standpoint or nearly the above maximum accuracy regardless of the shutter speed.

According to the second embodiment of the present invention, there is provided the electronic iris control circuit for a video camera which comprises the integrating circuit for integrating the output from the solid state imaging device, the reference value designating circuit for changing the upper reference value and/or lower reference value on the basis of the charge accumulation time, the comparing circuits for comparing the output from the integrating circuit with the upper and lower reference values, the clock generating circuit for generating the pulse at every horizontal blanking period, the counter for counting the pulse, the count value designating means for counting the count value counted by the counter and increasing or decreasing the designated count value in response to the compared results and the shutter pulse generating circuit for controlling the charge accumulation time by using the shutter pulse in response to the output timing of the counter.

Therefore, since the electronic iris control circuit of the second embodiment includes the reference value designating circuit that changes the upper reference value and/or the lower reference value on the basis of the charge accumulation time, the dead zone width that is the difference between the upper and lower reference values can be controlled on the basis of the charge accumulation time. Also, the error range of the iris can be reduced in accordance with the charge accumulation time.

More specifically, the width of the dead zone can be widened in response to the control sensitivity in the current shutter speed. Thus, the control sensitivity can be increased to the maximum accuracy determined from a principle standpoint or nearly the above maximum accuracy regardless of the shutter speed.

Further, the period of the shutter pulse is reduced in the vertical blanking period in order to widen the dynamic range of the iris. It is frequently observed that the iris dynamic range is selected in a range of from $\frac{1}{60}$ second to $\frac{1}{100000}$ second (or in a range of from $\frac{1}{60}$ second to $\frac{1}{200000}$ second or more). In that case, the number of steps is increased to about 900, which takes about 15 seconds for obtaining the optimum iris. It is needless to say that, if the dynamic range of the iris control is widened in a range of from $\frac{1}{60}$ second to $\frac{1}{200000}$ second, then a maximum value of time that is required to obtain the optimum iris is unavoidably increased. As a result, if intensity of light irradiated on the object is changed considerably, a time required to obtain the proper iris condition is increased too much to become practical.

A third embodiment of the electronic iris control circuit according to the present invention will be described in detail below. FIG. 9 is a block diagram showing a circuit arrangement of the third embodiment of the electronic iris control circuit according to the present invention. In FIG. 9, like parts corresponding to those of FIGS. 4 and 6 were already described and therefore need not be described herein. Therefore, only the circuit arrangement of the electronic iris control circuit 8 will be described below.

As shown in FIG. 9, the low-pass filter 9 integrates the video signal output from the sample and hold circuit 3 to generate the average value (DC value) in one field. There is provided an intensity detecting means 31 which receives the output signal of the low-pass filter 9 to detect the average (whole) brightness of the video signal. The intensity detecting means 31 comprises four comparing circuits COM1 to COM4.

The comparing circuits COM1 to COM4 are supplied at their non-inverting input terminals the output signal from the low-pass filter 9 and which are also supplied at their inverting input terminals with comparison reference voltages Vref1 to Vref4.

The comparison reference voltages Vref1 to Vref4 supplied to the comparing circuits COM1 to COM4 are different from each other. Therefore, the grade of the output of the low-pass filter 9 can be detected from five grades on the basis of the outputs from the comparing circuits COM1 to COM4.

More specifically, the maximum value and the minimum value of the output from the low-pass filter 9 are divided by the output of the intensity detecting means 31 to provide five regions. Accordingly, it can be determined which one of the five grades that the output of the low-pass filter 9 belongs. The five grades are classified as (1) very bright, (2) bright, (3) normal, (4) dark and (5) very dark.

There is shown a decoder 32 which detects from the output of the intensity detecting means 31 which one of the five regions (1) to (5) the output of the low-pass filter 9 belongs, and output an addition/subtraction signal and a response signal in response to a detected result.

The decoder 32 supplies the addition/subtraction signal which is representative of the addition to an adding/subtracting circuit 33 when the output of the low-pass filter 9 belongs to (1) very bright and (2) bright. The decoder 32 supplies the addition/subtraction signal which is representative of the subtraction to the adding/subtracting circuit 33 when the output of the low-pass filter 9 belongs to (4) dark and (5) very dark. When the output of the low-pass filter 9 belongs to (3) normal, the decoder 32 does not generate the command signal representative of the addition and the subtraction. That is to say, when the output of the low-pass filter 9 belongs to (3) normal, the charge accumulation time is not changed, and the grade (3) is referred to as the dead zone.

Further, the decoder 32 supplies a selector 34 with a response signal that designates a normal change of the charge accumulation time when the output of the low-pass filter 9 belongs to (2) bright or (4) dark. The decoder 32 supplies the selector 34 with a response signal that designates a rapid change of the charge accumulation time when the output of the low-pass filter 9 belongs to (1) very bright or (5) very dark.

The adding/subtracting circuit 33 adds or subtracts a calculated value of the selector 34 to or from a value stored in a latch circuit 35, and supplies its added or subtracted value to the latch circuit 35.

The selector 34 receives as input signals two calculated values of a normal change calculated value, e.g., "1" and a rapid change calculated value, e.g., "6", and also receives the response signal as a selection signal. Then, the selector 34 selects the input signal designated by the response signal from the two input signals supplied thereto and outputs the selected signal to the adding/subtracting circuit 33.

That is to say, when the response signal is the signal that designates the normal change, the selector 34 outputs the normal change calculated value, e.g., "1". When the response signal is the signal that designates the rapid change, the selector 34 outputs the rapid change calculated value, e.g., "6", whereby the accumulation time of the rapid change can be changed at speed six times as high as that of the normal change of the accumulation time. Incidentally, the normal change calculated value is not always limited to "1" and the rapid change calculated value also is not always limited to "6".

Further, the ordinary change calculated value may be set so that the shutter gain difference becomes the first value (e.g., 10%) and the rapid change calculated value may be set so that the shutter gain difference becomes a second value (e.g., 20%) larger than the first value. With this arrangement, a stable iris operation can be realized regardless of the duration of the accumulation time.

The latch circuit 35 is adapted to store the current value of the number of shutter pulses that should be output from the electronic iris control circuit 8 after the electronic iris control circuit 8 has generated the read-out pulse at every field. When the read-out pulse is generated from the electronic iris control circuit 8, the latch circuit 35 supplies its memorized value to the counter 16 and supplies the same to the adding/subtracting circuit 33. Then, the adding/subtracting circuit 33 adds or subtracts the calculated value of the selector 34 to or from the memorized value of the latch circuit 35 and loads the added or subtracted result to the latch circuit 35. The memorized value of the latch circuit 35 is updated by a series of the aforesaid operation.

When data representative of the number of shutter pulses that should be output after the read-out pulse had been generated at every field is loaded to the counter 16 from the latch circuit 35, the counter 16 counts the shutter pulses of the corresponding number. At the completion of the counting, the counter 16 supplies a carry to a gate circuit 37.

The gate circuit 37 is adapted to gate the shutter pulse and supplied the same to the solid state imaging device 2. The gate circuit 37 opens its gate in response to the read-out pulse supplied thereto at every field and closes its gate in response to the carry supplied thereto from the counter 16. Therefore, the shutter pulse is continuously output from the electronic iris control circuit 8 to the solid state imaging device 2 until the gate circuit 37 receives the carry from the counter 16 after having been received this read-out pulse.

Figure 10:
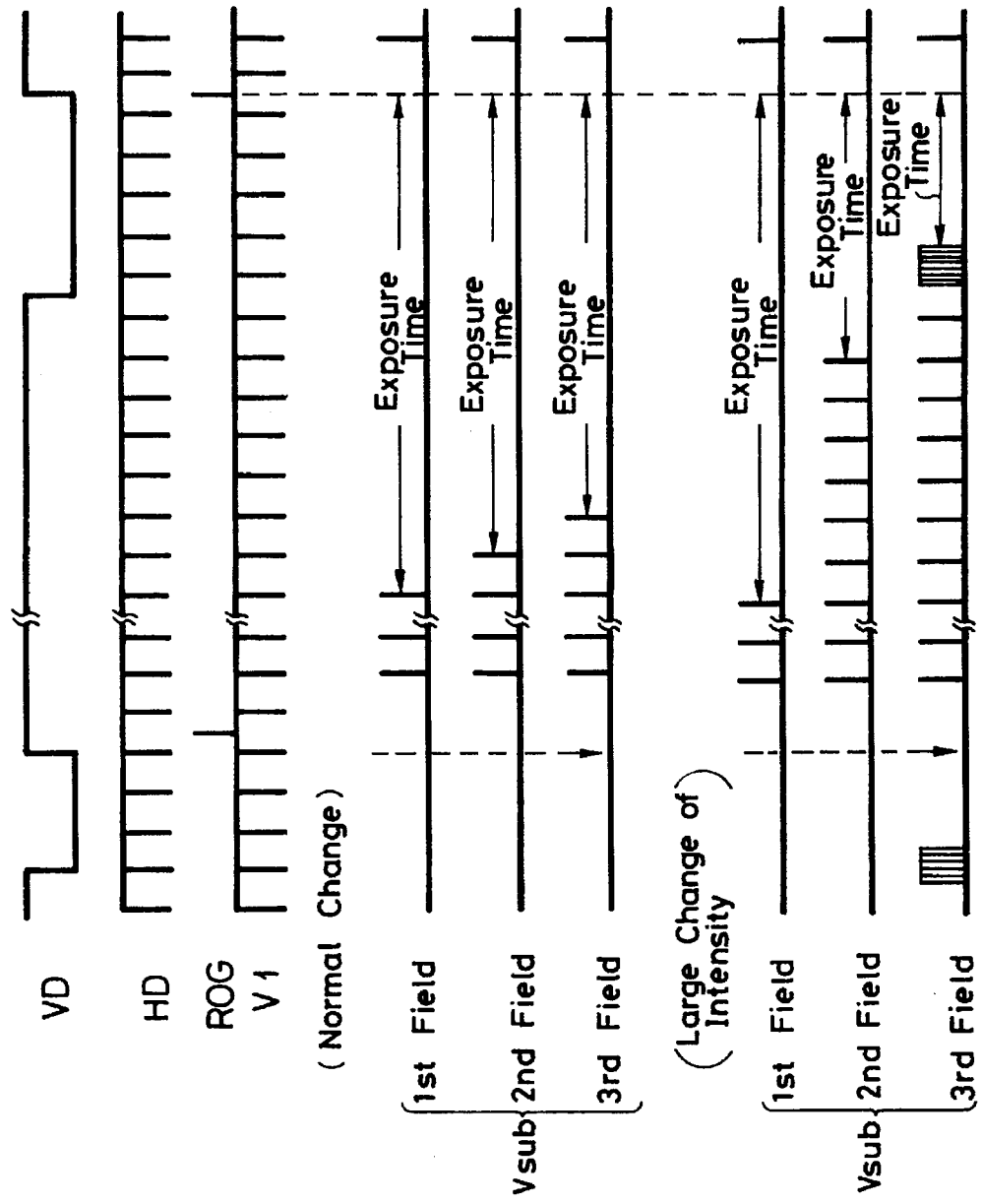
FIG. 10 is a timing chart used to explain operation of the electronic iris control circuit of the third embodiment shown in FIG. 9.

FIG. 10 is a timing chart used to explain operation of the electronic iris control circuit 8 according to the third embodiment of the present invention.

The video signal, sampled and held by the sample and hold circuit 3, is integrated by the low-pass filter 9 and thereby converted into a signal that represents an average value of one field. The signal thus converted is the very signal that represents the whole (average) brightness of the picture screen of one field.

This signal indicative of the intensity on the picture screen is input to the intensity detecting means 31 and the intensity detecting means 31 detects from the input signal which one of the five grades such intensity (brightness) belongs to.

Assuming that Vmax is the maximum value of the output V from the low-pass filter 9 and that Vmin is the minimum value of the output V from the low-pass filter 9, then when $Vmax \geq V \geq Vref1$ is satisfied, it is evaluated that the intensity is (1) very bright. When $Vref1 \geq V \geq Vref2$ is satisfied, it is evaluated that the intensity is (2) bright. When $Vref2 \geq V \geq Vref3$ is satisfied, it is evaluated that the intensity is (3) normal. When $Vref3 \geq V \geq Vref4$ is satisfied, it is appreciated that the intensity is (4) dark. When $Vref4 \geq V \geq Vmin$ is satisfied, it is appreciated that the intensity is (5) very dark.

Assuming now that the intensity is evaluated as (2) bright because $Vref1 > V > Vref2$ is satisfied, then the decoder 32 supplies the adding/subtracting circuit 33 with the addition/subtraction signal that represents the addition command signal and also supplies the selector 34 with the response signal that represents the normal change command signal.

The adding/subtracting circuit 33 adds a numerical value "1" output from the selector 34 to the value loaded thereinto from the latch circuit 35 after the read-out pulse ROG had been generated, whereby the memorized value in the latch circuit 35 is updated as a value incremented by "1".

Hence, this updated value becomes a shutter pulse that is supplied from the gate circuit 37 to the solid state imaging device 2 during the next field, whereby the charge accumulation time of the solid state imaging device 2 is reduced by one period of the shutter pulse, i.e., the iris is closed.

If the intensity is set to the normal intensity after the aforesaid operations were repeated, $Vref2 > V > Vref3$ is satisfied. Then, the decoder 32 is placed in the condition that it outputs neither the addition command signal nor the subtraction command signal so that the numerical value stored in the latch circuit 35 is not changed at all. Hence, the charge accumulation time is not changed.

Assuming next that $Vmax > V > Vref1$ is satisfied to determine the intensity as (1) very bright, then the decoder 32 supplies the adding/subtracting circuit 33 with the addition/ subtraction signal indicative of the addition command and also supplies the selector 34 with the rapid change command signal as the response signal.

Consequently, the memorized value in the latch circuit 35 is updated at one time to the rapid change calculated value, e.g., value increased by "6" so that the accumulation time at which the solid state imaging device 2 accumulates the signal charges is reduced by the amount, for example, six times the period of the shutter pulse at every field and the iris is energized at speed six times as high as the normal speed. Therefore, the intensity is decreased rapidly. Then, when Vref1>V>Vref2 is satisfied, the speed at which the accumulation time is changed is switched to the normal change speed. If the intensity is further decreased so as to satisfy Vref2>V>vref3, the accumulation time is no longer changed.

This electronic iris control circuit of the third embodiment is operated similarly to the case that the intensity is (2) bright and (1) very bright when the intensity is (4) dark and (5) very dark, and is different only in the following points. That is to say, the addition/subtraction signal becomes the signal that represents the subtraction command and the memorized value in the latch circuit 35 is updated to a value to be decreased, whereby the charge accumulation time is extended and the intensity is increased.

According to the electronic iris control circuit of the third embodiment of the present invention, the intensity is evaluated in five grades. When the intensity is evaluated as (1) very bright and (5) very dark, the intensity is rapidly changed so as to become a predetermined intensity. When the intensity reaches the predetermined intensity, the intensity is changed at the normal speed. Therefore, the responsiveness (control speed) in the control of the electronic iris can be enhanced.

While the intensity is evaluated in five grades as described above, the present invention is not limited thereto and the intensity may be evaluated in much more grades. In that case, if the responsiveness signal is switched in much more grades such as three grades and four grades unlike the aforesaid embodiment that the responsiveness signal is switched only in two grades, then the iris control speed can be changed more finely.

According to the third embodiment of the present invention, there is provided the electronic iris control circuit which includes the intensity detecting means for detecting which one of a number of divided regions, which result from dividing the maximum value and the minimum value of the video signal, the detected value of average value of the video signal belongs. The charge accumulation time can be controlled at the response speed corresponding to the output of the intensity detecting means in such a fashion that the detected value of the video signal becomes nearly equal to the predetermined value.

Therefore, according to the above electronic iris control circuit, the divided region that the detected value of the average value of the video signal falls is detected by the intensity detecting means and the iris of the solid state imaging device can be controlled in response to the response speed corresponding to the detected result, whereby the response speed in the iris control operation can be increased.

The electronic iris control circuit of the third embodiment includes the intensity detecting means that comprises a plurality of comparing circuits for comparing different comparison values with the detected value of the average value of the video signal.

According to this electronic iris control circuit, the region to which the average value of the video signal belongs can be detected on the basis of the outputs from a plurality of comparing circuits that construct the intensity detecting means.

Further, according to the third embodiment of the present invention, there is provided the electronic iris control circuit which comprises the low-pass filter for detecting the average value of the video signal, the intensity detecting means formed of a plurality of comparing circuits for comparing the different comparison reference values with the outputs of the low-pass filter, the decoder for generating on the basis of the output signals from the respective comparing circuits in the intensity detecting means the addition/subtraction signal that designates the addition or subtraction in response to whether the intensity is larger than or smaller than the predetermined value, the latch circuit for memorizing the current value of the number of shutter pulses to be output after the read-out pulse had been generated, the adding/subtracting circuit for adding or subtracting the value corresponding to the response signal from the decoder to or from the value stored in the latch circuit in response to the addition/subtraction signal from the decoder and loading the same into the latch circuit, the counter for counting the shutter pulse or the pulse synchronized with the shutter pulse times of the count value designated by the latch circuit when supplied with the readout pulse, and the gate circuit for permitting the shutter pulse to be supplied to the solid state imaging device in response to the read-out pulse supplied thereto and inhibiting the shutter pulse from being supplied to the solid state imaging device when supplied with the carry after the counter has finished the counting of the designated count value.

Therefore, according to the electronic iris control circuit of the third embodiment of the present invention, the low-pass filter detects the average value of the video signal, the intensity detecting means formed of a plurality of comparing circuits detects one of the divided regions to which the detected value belongs, the decoder processes the detected result to generate the addition/subtraction signal that designates the reduction or extension of the accumulation time and also the response signal that designates the increase or decrease of the speed at which the accumulation time is changed, the adding/subtracting circuit adds or subtracts the current value of the number of shutter pulses to or from the value stored in the latch circuit in response to the addition/subtraction signal and the response signal after the read-out signal had been generated, the counter counts the shutter pulses times corresponding to the value stored in the latch circuit and which is added or subtracted after the readout pulse had been generated and the gate circuit outputs the shutter pulse to the solid state imaging device during the counter counts the shutter pulses. Therefore, the intensity can be controlled by changing the signal charge accumulation time. Also, the speed at which the signal charge accumulation time is changed can be changed in response to the intensity of the picture screen. Besides, the responsiveness of the iris can be enhanced.

A fourth embodiment of the electronic iris control circuit 8 according to the present invention will be described below with reference to FIGS. 11 and 12.

Figure 11:
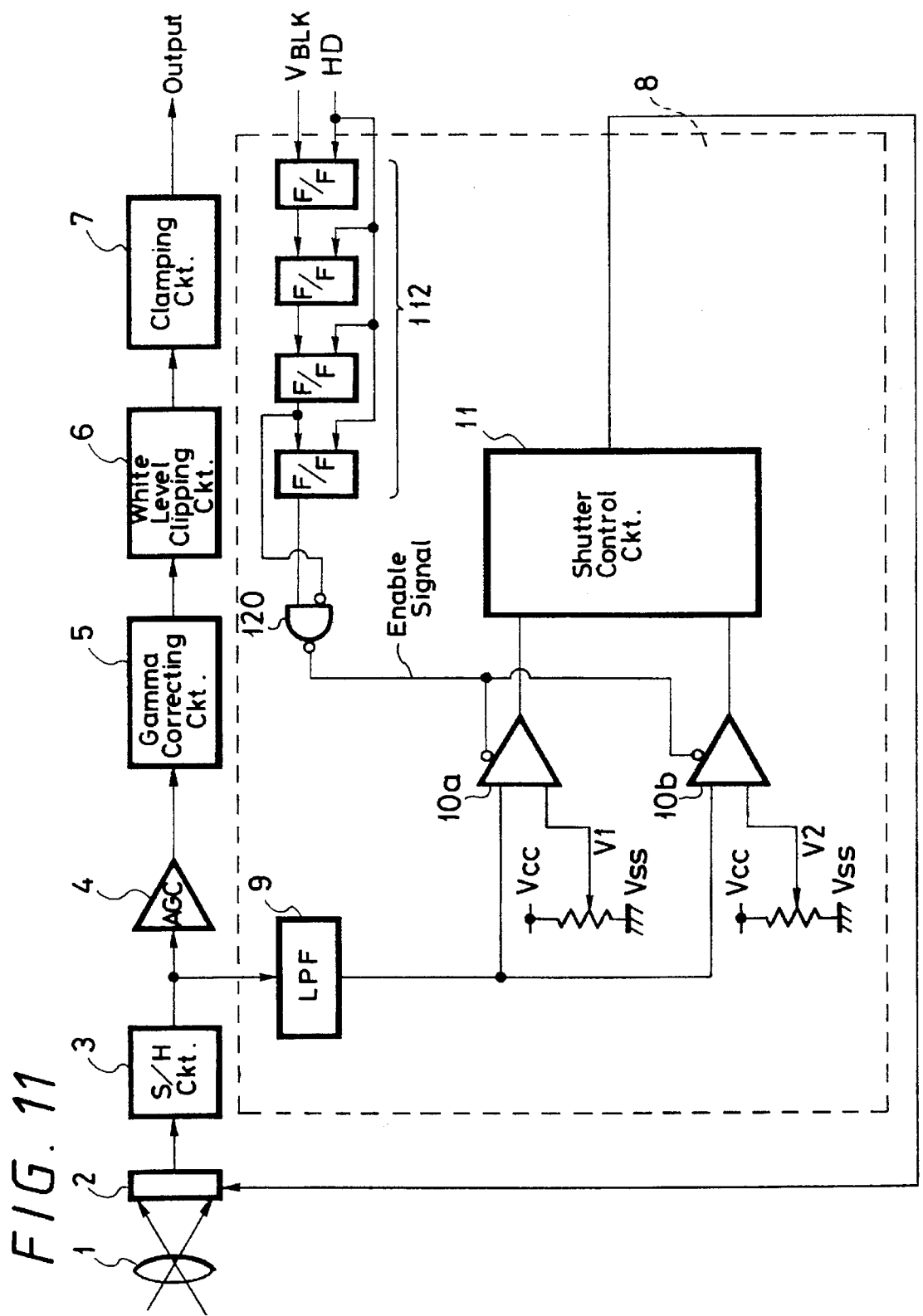
FIG. 11 is a block diagram showing an electronic iris control circuit according to a fourth embodiment of the present invention shown in FIG. 10.

FIG. 11 is a block diagram showing a circuit arrangement of the electronic iris control circuit according to the fourth embodiment of the present invention. FIG. 12 is a timing chart used to explain operation of the electronic iris control circuit 8 shown in FIG. 11.

The electronic iris control circuit 8 of the fourth embodiment is considerably different from the conventional circuit shown in FIG. 1 in that comparing circuits 110a, 110b of this embodiment are energized only when supplied with an enable signal and that a delay circuit 112 and a NAND circuit 120 generate a pulse at a particular timing point within the vertical blanking period to thereby apply the same to the comparing circuits 110a, 110b. A rest of elements and parts are similar to those mentioned before and only different elements and parts will be described herein.

Referring to FIG. 11, there are provided the comparing circuits 110a, 110b that are operated only when supplied with the enable signal. The delay circuit 112 comprises four flip-flops F/F connected in cascade and delays the vertical blanking signal $V_{BLK}$ when supplied with the horizontal synchronizing signal HD as the clock pulse. To be more concrete, the delay circuit 112 delays the vertical blanking signal $V_{BLK}$ so that this vertical blanking signal becomes a signal that is delayed by three horizontal period from the first horizontal synchronizing signal HD of the vertical blanking period.

The NAND circuit 120 receives the output signal of the delay circuit 112 and a signal which results from inverting the output signal from the flip-flop F/F next to the final flip-flip F/F to generate the enable signal having a pulse width of one horizontal period. The output of the NAND circuit 120 is input to the comparing circuits 110a, 110b as the enable signal. The comparing circuits 110a, 110b can be operated in response only to the enable signal.

According to the electronic iris control circuit 8 of the fourth embodiment of the present invention, since the comparing circuits 110a, 110b are operated in response only to the enable signal that is generated during the vertical blanking period, the output signals from the comparing circuits 110a, 110b can be prevented from being changed during the vertical effective period. There is then no risk at all that, when the output signals from the comparing circuits 110a, 110b are changed, a bad influence is exerted upon the video signal by a crosstalk component so that a noise appears on the picture, which deteriorates the picture quality.

Insofar as the enable signal is generated during the vertical blanking period, the enable signal need not be generated at the timing point delayed 3H from the starting timing point of the vertical blanking period. It is sufficient that the enable signal is prevented from being generated during the vertical effective period so as not to energize the comparing circuits 110a, 110b.

According to the electronic iris control circuit of the fourth embodiment, since the comparing circuits are operated only during the vertical blanking period, there is then no possibility that the outputs of the comparing circuits will be changed during the vertical effective period. Therefore, the output video signal from the solid state imaging device can be prevented from being affected by the outputs from the comparing circuits during the vertical effective period. Therefore, the picture quality can be prevented from being deteriorated by the change of the outputs from the comparing circuits.

Further, since the electronic iris control circuit of the fourth embodiment is comprised of the delay circuit for delaying the input vertical blanking signal by a delay amount of an integral multiple of the horizontal period, and the enable signal generating circuit for generating the pulse having a certain pulse width from the output of the delay circuit. Therefore, according to the aforesaid electronic iris control circuit, since the vertical blanking period is delayed by the delay amount of the integral multiple of the horizontal period by the delay circuit and the pulse is generated from the enable signal generating circuit, this pulse is applied to the comparing circuits as the enable signal, whereby the comparing circuits can be operated only during the vertical blanking period.

Having described preferred embodiments of the invention with reference to the accompanying drawings, it is to be understood that the invention is not limited to those precise embodiments and that various changed and modifications could be effected therein by one skilled in the art without departing from the spirit or scope of the invention as defined in the appended claims.

What is claimed is:

1. A video camera comprising:
   a video image sensing device for sensing an incident light and generating charges and supplying an output signal corresponding to said charges, said video image sensing device having an electronic shutter;
   first and second comparators for comparing a level of said output signal with variable first and second reference levels to generate compared output signals, respectively, said first and second reference levels respectively bounding upper and lower levels of a dead zone;
   exposure time controlling means for receiving said compared output signals and controlling an exposure time of said video image sensing device according to said compared output signals, said exposure time controlling means coupled to said electronic shutter in controlling said exposure time by controlling said electronic shutter; and
   control means for controlling said first and second reference levels according to a duration of said exposure time by increasing an absolute difference between said first and second reference levels as said exposure time decreases.

2. The video camera according to claim 1, wherein said control means control said first and second reference levels by increasing said first reference level and decreasing said second reference level as a shutter gain difference is increased as said exposure time is decreased.

3. The video camera according to claim 1, wherein said video image sensing device accumulates said charges and said exposure time controlling means controls an accumulation time period of said video image sensing device.

4. The video camera according to claim 3, wherein said control means discharges said charges accumulated in said video image sensing device.

5. The video camera according to claim 1, wherein said dead zone is centered about a constant ideal converging value.

6. An electronic shutter control circuit for a video camera, said circuit controlling an exposure time of the video camera in response to an incident light signal, comprising:
   first and second comparators for receiving said incident light signal and comparing a level of said incident light with variable first and second reference levels to generate compared output signals, said first and second reference levels respectively bounding upper and lower levels of a dead zone;
   exposure time controlling means for receiving said compared output signals and controlling an exposure time of a video image sensing device according to said compared output signals, said exposure time controlling means coupled to said electronic shutter and controlling said exposure time by controlling said electronic shutter; and control means for controlling said first and second reference levels according to a duration of said exposure time by increasing an absolute difference between said first and second reference levels as said exposure time decreases.

7. The electronic shutter control circuit of claim 6, wherein said video image sensing device senses incident light and generates said incident light signal.

8. The electronic shutter control circuit of claim 7, wherein said control means discharges said charges accumulated in said video image sensing device.

9. The electronic shutter control circuit of claim 8, wherein said video image sensing device accumulates charges and said exposure time controlling means controls an accumulation time period of said video image sensing device.

10. The electronic shutter control circuit of claim 6, wherein said control means controls said first and second reference levels by increasing said first reference level and decreasing said second reference level as exposure time decreases.

11. The electronic shutter control circuit of claim 6, wherein dead zone is centered about a constant ideal converging value.

* * * * *